(12) United States Patent
Orita

(10) Patent No.: US 6,272,112 B1
(45) Date of Patent: Aug. 7, 2001

(54) REPEATING UNIT TESTING SYSTEM AND COMMUNICATION APPARATUS AS WELL AS COMMUNICATION METHOD

(75) Inventor: Suehiro Orita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/059,380

(22) Filed: Apr. 14, 1998

(30) Foreign Application Priority Data

Nov. 13, 1997 (JP) .................................................. 9-312452

(51) Int. Cl.⁷ ...................................................... H04L 1/00
(52) U.S. Cl. ............................ 370/243; 370/246; 370/252
(58) Field of Search ..................................... 370/246–251, 370/401–405, 252, 253

(56) References Cited

U.S. PATENT DOCUMENTS 5,596,574 * 1/1997 Perlman et al. ..................... 370/389
5,724,510 * 3/1998 Arndt et al. ...................... 395/200.5

FOREIGN PATENT DOCUMENTS

| | | |
|---|---|---|
| 58-14641 | 1/1983 | (JP) . |
| 63-139461 | 6/1988 | (JP) . |
| 4-27246 | 1/1992 | (JP) . |
| 4-100473 | 4/1992 | (JP) . |

* cited by examiner

Primary Examiner—Melvin Marcelo
(74) Attorney, Agent, or Firm—Staas & Halsey LLP

(57) ABSTRACT

In a repeating unit testing system, a first tester includes first packet transmission means for transmitting a plurality of packets, whose transmission destination address is a second repeating unit, to a first repeating unit for a fixed period of time, and line connection-disconnection log information collection means for collecting log information regarding connection and disconnection of a line from the first or second repeating unit. The first repeating unit includes line connection-disconnection means for connecting a line to a second communication network or disconnecting the line if transmission of packets is not received for more than a fixed period of time, and second packet transmission means for receiving the packets and transmitting the packets to a third port. Further, the first or second repeating unit includes line connection-disconnection log information acquisition means for acquiring log information, and line connection-disconnection log information transmission means for transmitting the log information to the first tester.

33 Claims, 8 Drawing Sheets

FIG. 7

PACKET TRANSMISSION ⎫
PACKET TRANSMISSION ⎬ COMMUNICATION PROTOCOL A
⋮
PACKET TRANSMISSION ⎭

NO-COMMUNICATION SUPERVISION TIME TO,
COMMUNICATION STOPPING TIME OT,
OR COMMUNICATION STOPPING TIME OT

PACKET TRANSMISSION ⎫
PACKET TRANSMISSION ⎬ COMMUNICATION PROTOCOL B
⋮
PACKET TRANSMISSION ⎭

NO-COMMUNICATION SUPERVISION TIME TO,
COMMUNICATION STOPPING TIME OT,
OR COMMUNICATION STOPPING TIME OT

PACKET TRANSMISSION ⎫
⋮
PACKET TRANSMISSION ⎬ COMMUNICATION PROTOCOL X
PACKET TRANSMISSION
⋮
PACKET TRANSMISSION ⎭

LOG COLLECTION

REPEATING UNIT TESTING SYSTEM AND COMMUNICATION APPARATUS AS WELL AS COMMUNICATION METHOD

BACKGROUND OF THE INVENTION

1. Field of the Invention

This invention relates to a repeating unit testing system for a repeating unit such as a router which repeats communication between a plurality of apparatus and a communication apparatus as well as a communication method, and more particularly to tests of the line connection time and the total packet number between a repeating unit and a communication network such as a public line.

2. Description of the Related Art

As a result of development of the communication technique, a large scale user takes a form wherein local area networks (local area network is hereinafter referred to as LAN) at various positions in the whole country are connected to each other by a wide area network. In this form, such a connection form of a first LAN—first router (repeating unit)—WAN such as an INS network—second router (repeating unit)—second LAN is taken. In a connection form of such a type as just described, a first LAN terminal accommodated in the first LAN sets an address (for example, an IP address) of a second LAN terminal accommodated in the second LAN to packets and transmits the packets to the first router. The first router refers to its routing table to determine an output port for the packets from the IP address and transmits the packets from the port to the second router through the INS network.

The second router refers to its routing table to determine an output port for the packets from the IP address and transmits the packets to the second LAN terminal. The second LAN terminal receives the packets. When such packets are transmitted using a public network such as an INS network, it is charged by a time rate or a meter rate. According to the time rate, the charge depends upon a connection time of the INS network, and according to the meter rate, the charge depends upon the number of transmitted packets. Accordingly, when the first router connects a line to the INS network and transmits packets, if excessive time is required for the line connection or a surplus packet is transmitted to the INS network, then an excessive amount of money is charged, which is inconvenient for the user. In order to eliminate such a situation, a test is required to confirm that the line connection time between each router and the INS network is normal and that the total transmission packet number is normal.

Conventionally, the line connection time or the packet number is confirmed by outputting information (log information) recorded by a router to an outputting apparatus such as a printer so as to allow manual confirmation or by developing a warning if the connection time or the packet number exceeds a threshold value. Besides, such confirmation relies upon actual connection to and communication with an INS network. However, conventionally a correct value to be used for reference for confirmation of whether or not a result of a test is normal must be calculated by comparison with a log by a human being, and this is disadvantageous in that much time is required for the calculation and besides the reliability is low.

SUMMARY OF THE INVENTION

Accordingly, it is an object of the present invention to provide a repeating unit testing system which can perform tests of the connection time between repeating units and the total packet number readily and with certainty.

In accordance with an aspect of the present invention, there is provided a repeating unit testing system which includes a first tester accommodated in a first communication network, a first repeating unit having a first port connected to the first communication network and a second port connected to a second communication network, and a second repeating unit having a third port connected to the second communication network, comprising first packet transmission means provided in the first tester for transmitting a plurality of packets whose transmission destination address is the second repeating unit to the first communication network for a fixed period of time, second packet transmission means provided in the first repeating unit for receiving the packets from the first port and transmitting the packets from the second port to the second communication network, packet reception means provided in the second repeating unit for receiving the packets from the third port, line connection-disconnection log information acquisition means provided in the first or second repeating unit for acquiring log information regarding connection and disconnection of a line of the second communication network between the second port and the third port, and line connection-disconnection log information collection means provided in the first tester for collecting the log information.

In accordance with another aspect of the present invention, there is provided a repeating unit testing system which includes a first tester accommodated in a first communication network, a first repeating unit having a first port connected to the first communication network and a second port connected to a second communication network, and a second repeating unit having a third port connected to the second communication network, comprising first packet transmission means provided in the first tester for transmitting a fixed number of packets whose transmission destination address is the second repeating unit to the first communication network, second packet transmission means provided in the first repeating unit for receiving the packets from the first port and transmitting the packets from the second port to the second communication network, packet reception means provided in the second repeating unit for receiving the packets from the third port, packet log information acquisition means provided in the first or second repeating unit for acquiring log information regarding the packet transmission or the packet reception, and packet log information collection means provided in the first tester for collecting the log information.

The above and other objects, features and advantages of the present invention and the manner of realizing them will become more apparent, and the invention itself will best be understood, from a study of the following description and appended claims with reference to the attached drawings showing some preferred embodiments of the invention.

BRIEF DESCRIPTION OF THE DRAWINGS

FIG. 7 is a sequence diagram illustrating a test sequence for multi-protocols by the first tester shown in FIG. 2.

DESCRIPTION OF THE PREFERRED EMBODIMENTS

In the following, embodiments of the present invention are described with reference to the drawings.

Figure 1:
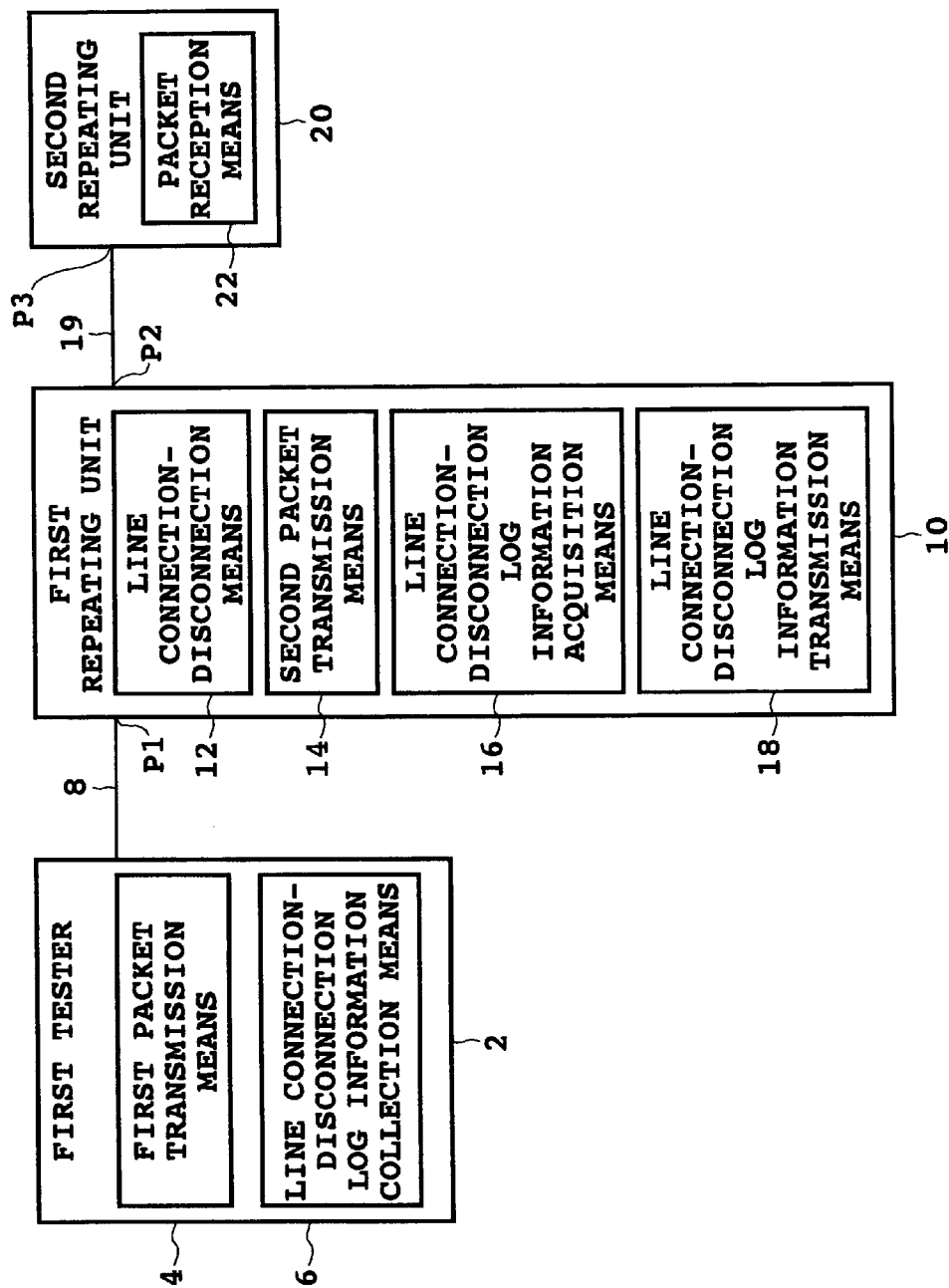
FIG. 1 is a basic block diagram of a repeating unit testing system according to the present invention.

FIG. 1 is a basic block diagram of a repeating unit testing system according to the present invention. Referring to FIG. 1, the repeating unit testing system includes a first tester 2, a first repeating unit 10 and a second repeating unit 20. The first tester 2 is connected to a first communication network 8. The first communication network 8 is accommodated in a first port P1 of the first repeating unit 10. A second port P2 of the first repeating unit 10 and a third port P3 of the second repeating unit 20 are connected to a second communication network 19. The first tester 2 includes first packet transmission means 4 for transmitting testing packets, and line connection-disconnection log information collection means 6 for collecting log information regarding connection and disconnection of a line of the second communication network 19 which interconnects the second port P2 and the third port P3.

The first repeating unit 10 includes line connection-disconnection means 12 for connecting and disconnecting the line of the second communication network 19 which interconnects the second port P2 and the third port P3, second packet transmission means 14 for receiving packets and transmitting the packets to the third port P3 which corresponds to a destination address, line connection-disconnection log information acquisition means 16 for acquiring log information regarding connection and disconnection of lines, and line connection-disconnection log information transmission means 18 for transmitting line connection-disconnection log information to the first tester 2. The second repeating unit 20 includes packet reception means 22 for receiving packets. According to the construction described above, after packets destined for the second repeating unit 20 are transmitted for a fixed period of time to the first communication network 8 by the first packet transmission means 4, transmission of packets is stopped. The second packet transmission means 14 receives the packets from the first communication network 8 and transmits, if the line of the second communication network 19 which interconnects the second port P2 which corresponds to the packet destination and the third port P3 is connected, the packets from the second port P2 to the second repeating unit 20 indicated by the destination address of the packets.

If the line of the second communication network 19 which interconnects the second port P2 and the third port P3 is not connected, then the line connection-disconnection means 12 performs line connection of the second communication network 19, and the line connection-disconnection log information acquisition means 16 acquires log information regarding the line connection, for example, a line connection time point. After the line connection between the second port P2 and the third port P3 is performed, the second packet transmission means 14 transmits the packets from the second port P2 to the second repeating unit 20 indicated by the destination address of the packets. The line connection-disconnection means 12 disconnects the line to the second communication network 19 if packets are not received from the second port P2 for more than a fixed period of time because the first packet transmission means 4 stops transmission of packets. The line connection-disconnection log information acquisition means 16 acquires log information regarding the line disconnection such as a time at which the line is disconnected.

The line connection-disconnection log information collection means 6 requests the first repeating unit 10 for transmission of log information regarding connection-disconnection of the line of the second communication network 19 which interconnects the second port P2 and the third port P3 and then receives such log information. The line connection-disconnection log information transmission means 18 transmits the log information regarding connection-disconnection of the line in response to the request from the first repeating unit 10. The log information is compared with an expected value of the packet transmission time to discriminate the validity of the line connection time of the first repeating unit 10.

First Embodiment

Figure 2:
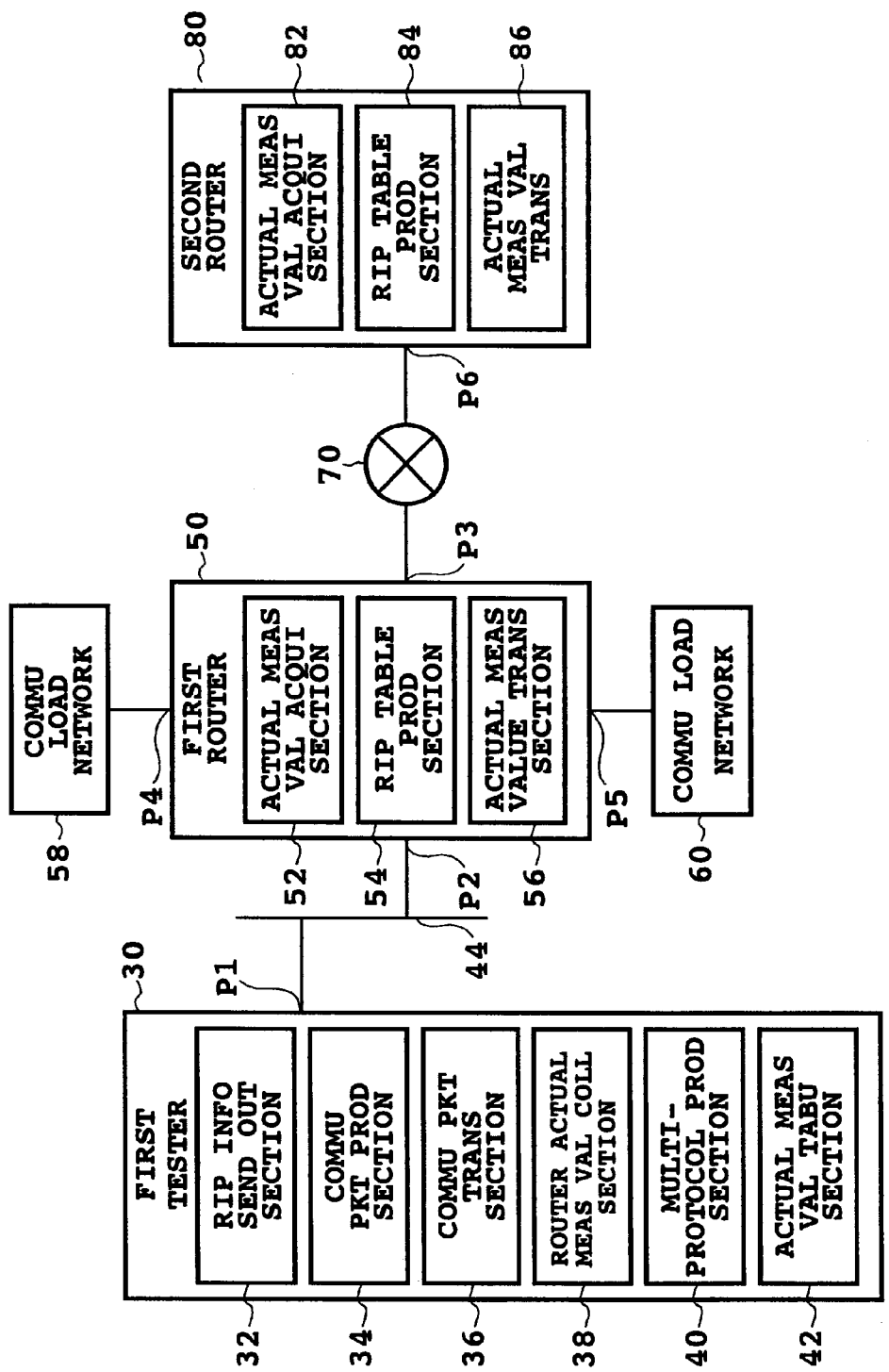
FIG. 2 is a block diagram of a repeating unit testing system according to a first embodiment of the present invention.

FIG. 2 is a block diagram of a repeating unit testing system according to a first embodiment of the present invention. Referring to FIG. 2, the repeating unit testing system shown includes a first tester 30, a LAN 44, a first router 50, communication load networks 58 and 60, an INS artificial network 70 and a second router 80. The first tester 30 is a testing LAN terminal unit for testing the line connection time and the total transmission packet number of the INS artificial network 70 which interconnects a third port P3 of the first router 50 and the second router 80, and includes a RIP information sending out section 32, a communication packet production section 34, a communication packet transmission section 36, a router actual measurement value collection section 38, a multi-protocol production section 40 and an actual measurement value tabulation section 42.

The RIP information sending out section 32 performs transmission of routing information for accommodating first tester in the first router 50 as a LAN terminal and transmission of routing information of a LAN terminal accommodated artificially so that the number of LAN terminals accommodated in the LAN network 44 may be increased to increase the scale of the LAN network 44 so that the LAN network 44 may be a large scale network as viewed from the first router 50, and transmission of routing information to vary the network scale of LAN terminals accommodated artificially in such a manner as just described as time passes. The reason why a large scale network is constructed artificially and the network scale is varied with respect to time in this manner is that a test of the first router 50 is performed in a condition close to an actual operation condition to secure a high degree of reliability of the test.

Of various protocols for a LAN, the Internet protocol is installed in and utilized widely by a large number of computers and apparatus and is popularly supported as a standard protocol for a router. In the Internet, routing information (RIP information) which is required in order to transmit data is exchanged between routers by a RIP (Routing Information Protocol) to allow routing. The RIP information is received from an accommodated LAN terminal or the like, and if RIP information is received, then a router registers it into its RIP table and routes the accommodated LAN terminals. Further, the router transmits the RIP information to another router. In the present embodiment, the RIP information sending out section 32 transmits RIP information by the Routing Information Protocol to the first router 50 to effect transmission of routing information.

The communication packet production section 34 produces communication packets in accordance with parameters determined based on the interval between transmission packets to be transmitted, the transmission packet number and so forth in response to a test of the line connection time or a test of the packet number which makes an object of the test. It is to be noted that the destination to be set to the communication packets is an IP address of a particular application layer of the second router 80. The communication packet transmission section 36 transmits communication packets to the LAN 44. The router actual measurement value collection section 38 collects log information acquired by the first router 50. The multi-protocol production section 40 produces communication packets in conformity with each of the protocols A to X in order to perform a test of the first router 50 for each protocol.

The actual measurement value tabulation section 42 performs calculation of the line connection time and calculation of the total packet number from actual measurement values collected by the router actual measurement value collection section 38 and produces a test result report which includes the line connection time and the total packet number as well as an expected value of the line connection time and an expected value of the total packet number. The first tester 30 is accommodated in the LAN 44 by an LAN card inserted in the port P1 or the like. It is to be noted that, while it is arbitrary to accommodate other LAN terminals in the LAN 44, in the present embodiment, only the first tester 30 is accommodated in the LAN 44 from the point of view of the testing cost. The RIP information sending out section 32, communication packet production section 34, communication packet transmission section 36, router actual measurement value collection section 38, multi-protocol production section 40 and actual measurement value tabulation section 42 are realized, for example, by communication software on a personal computer as a LAN terminal.

The first router 50 is a router as a repeating unit of an object of a test, and performs routing of a LAN (FDDI, CSMA/CD, token ring or the like) or a wide area network (INS network, high speed digital network or the like), acquisition of log information, updating of the RIP table and transmission of log information, and includes a routing section not shown, an actual measurement value acquisition section 52, a RIP table production section 54 and an actual measurement value transmission section 56. The actual measurement value acquisition section 52 acquires log information (for example, line connection or disconnection time) regarding line connection-disconnection to the INS artificial network 70 and log information (for example, a packet transmission time point) regarding transmission packets for each port.

The RIP table production section 54 registers RIP information received from the first tester 30 into the RIP table and reports the RIP information to the second router 80. The actual measurement value transmission section 56 extracts log information regarding line connection-disconnection and packet transmission of a port designated by the first tester 30 from within the log file and transmits the information to the first tester 30. The actual measurement value transmission section 56 is realized, for example, by communication software having a particular IP address. In ports P4 and P5 of the first router 50, the communication load networks 58 and 60, for example, FDDI, ATM networks or the like are accommodated. The communication load networks 58 and 60 are used to perform a test applying communication loads to the first router 50. This is because there is the possibility that the first router 50 may malfunction depending upon whether the communication load is heavy or light.

A second port P2 of the first router 50 accommodates the LAN 44 while another port P3 accommodates the INS artificial network 70. The INS artificial network 70 has a transmission function same as that of an actual INS network. Here, the reason why the INS artificial network 70 is used is that, if an actual INS is built up and tested, then the royalty of the INS network is required, which is disadvantageous in terms of the cost and the physical aspect. It is to be noted that it is naturally possible to connect the first router 50 to an actual INS network to test the first router 50. The second router 80 is a router having a function same as that of the first router 50, and includes an actual measurement value acquisition section 82, a RIP table production section 84 and an actual measurement value transmission section 86.

The actual measurement value acquisition section 82 has a function similar to that of the actual measurement value acquisition section 52 and acquires log information regarding the line connection time and log information regarding the received packet number by terminating connection to a port P6 from the INS artificial network 70. The actual measurement value acquisition section 82 is provided because, while tests of the line connection time and the packet number are possible if the actual measurement value acquisition section 52 of the first router 50 is present, it may be used together with the actual measurement value acquisition section 52 of the first router 50.

The RIP table production section 84 has a function similar to that of the RIP table production section 54 of the first router 50. The actual measurement value transmission section 86 has a function similar to that of the actual measurement value transmission section 56 of the first router 50. The RIP table production section 84 and the actual measurement value transmission section 86 are provided because, while tests of the line connection time and the packet number are possible if the actual measurement value acquisition section 52 and the actual measurement value transmission section 56 of the first router 50 are present, they may be used together with the first router 50. The second router 80 accommodates the INS artificial network 70 at the port P6 thereof.

In the following, operation of the repeating unit testing system of FIG. 2 is described.

a) Test of the Line Connection Time

Figure 3:
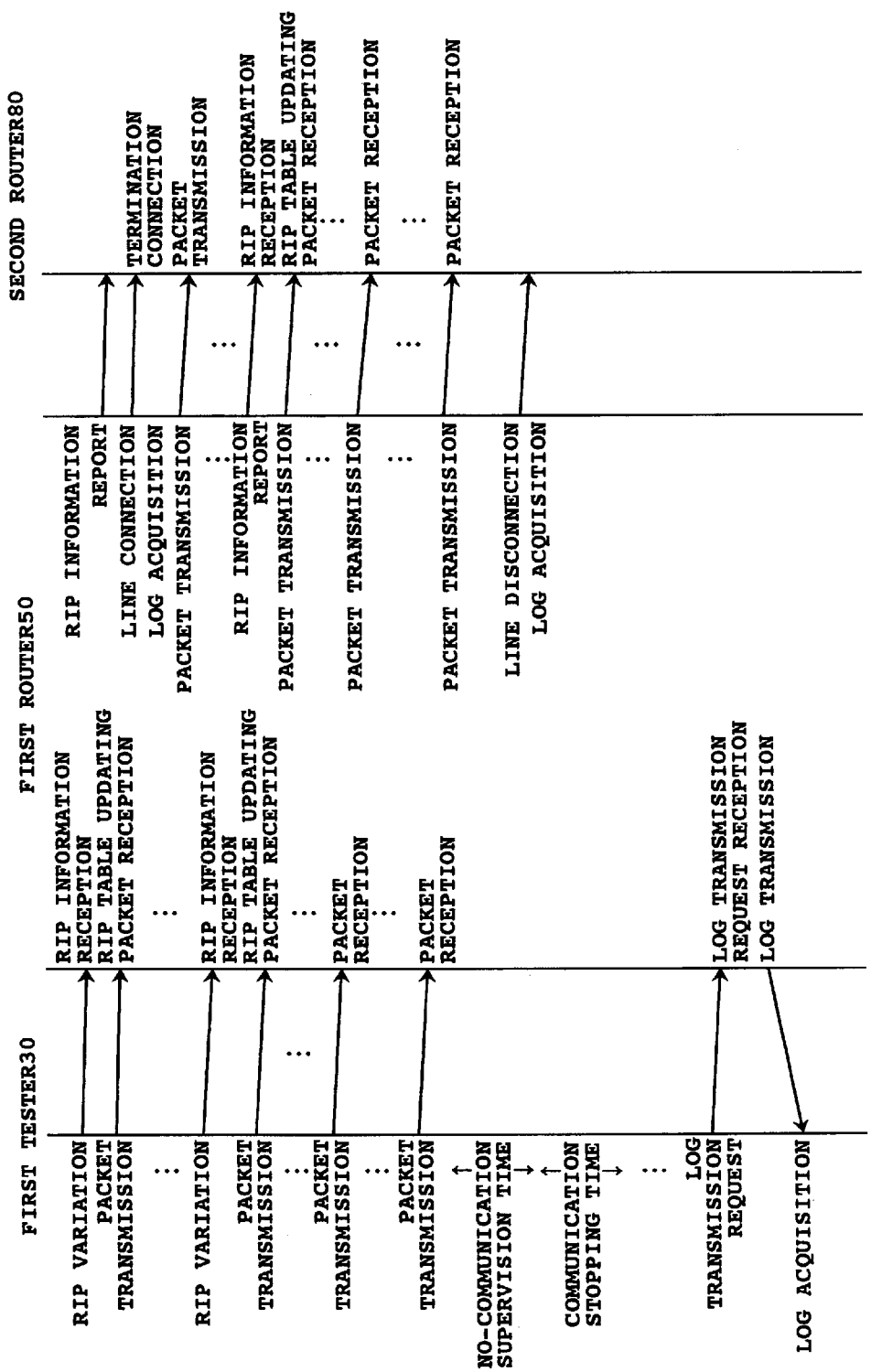
FIG. 3 is a sequence diagram illustrating a test sequence of the line connection time of the repeating unit testing system shown in FIG. 2.

FIG. 3 is a sequence diagram illustrating a test sequence of the line connection time of the repeating unit testing system of FIG. 2. The RIP information sending out section 32 produces, in order to perform a test of the first router 50 under a large scale network, RIP information of approximately several tens thousand bits within a fixed period of time (for example, 30 seconds) and transmits the RIP information to the first router 50. Thereupon, also RIP information of the first tester 30 itself is transmitted. This is because the RIP information (IP address) of the self apparatus is required when log information is to be collected. Further, during the test described below, the RIP information sending out section 32 varies the number of bits of RIP information to be sent out within the fixed time. This is because it is intended to vary the network scale of the LAN 44 as time passes. Here, the reason why the fixed time is set is that, when no RIP information is received within the fixed time, the RIP information is deleted from the RIP table by the RIP table production section 54 in the first router 50 which will be hereinafter described.

The RIP table production section 54 in the first router 50 receives the RIP information from the port P2 and registers the RIP information into the RIP table. The RIP table production section 54 deletes that RIP information which remains not transmitted after lapse of the fixed time from the RIP table. The RIP table production section 54 transmits the RIP information from the port P3 to the second router 80 through the INS artificial network 70.

The second router 80 receives the RIP information from the first router 50 and registers the RIP information into the RIP table. The second router 80 transmits the RIP information of itself to the first router 50, and the RIP table production section 54 receives the RIP information of the second router 80 and resisters it into the RIP table. Consequently, RIP information of several tens hundred bits is registered in the RIP table of the first router 50. Therefore, from the first router 50, a test can be performed in a condition close to an actual environment wherein the LAN 44 is a large scale network and the network scale appears to vary as time passes.

Figure 4:
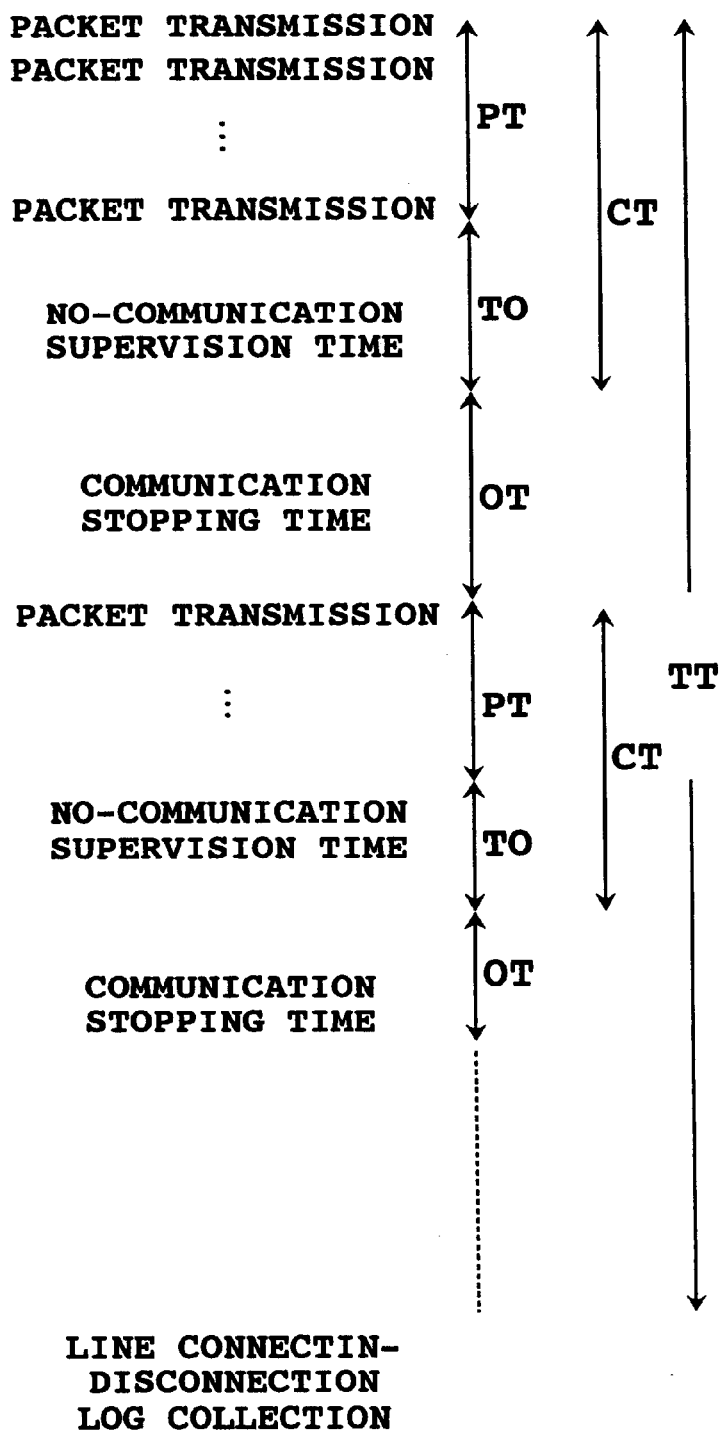
FIG. 4 is a sequence diagram illustrating a test sequence of the connection time by a first tester shown in FIG. 2.

FIG. 4 is a sequence diagram illustrating a test sequence of the line connection time by the first tester shown in FIG. 2. Referring to FIG. 4, a sequence of a communication time (for example, 4 seconds) CT which is a sum total of a packet transmission time (for example, 30 seconds) PT for transmission of a plurality of packets at fixed intervals (for example, 10 ms) and a no-transmission supervision time (No Communication time out) TO (for example, 1 minute) within which line disconnection between the port P2 of the first router 50 and the INS artificial network 70 is automatically performed by the first router 50 when transmission of packets is not received for a fixed period of time and a communication stopping time (for example, 3 minutes) OT (Off time) is repeated by a predetermined number of times, and after a total test time TT (for example, 1 hour) passes, a procedure of collecting and confirming log information is taken.

The communication packet production section 34 produces transmission packets within the packet transmission time PT using an address (IP address) of the second router 80 as a destination address. The communication packet transmission section 36 transmits the transmission packets from the port P1 to the LAN 44. Meanwhile, the communication load networks 58 and 60 always apply communication loads to the first router 50. This is because it is intended to test the first router 50 in a large communication traffic condition by applying the communication loads to the first router 50. The first router 50 receives the transmission packets and retrieves the IP address indicated by the transmission packets from within the RIP table to determine the port P3 which makes a destination of transmission. If the line of the INS artificial network 70 which interconnects the port P3 and the second router 80 is not connected, then the first router 50 originates a call to the INS artificial network 70 based on a dial number of the port P6 of the second router 80 registered in advance therein to connect the line.

The actual measurement value acquisition section 52 records log information regarding the line connection, for example, the line connection time point and the port number of the port P3, into the log file. The first router 50 transmits the communication packets from the port P3 to the INS artificial network 70 in accordance with the IP address of the communication packets. The actual measurement value acquisition section 82 of the second router 80 records, if a call is terminated from the INS artificial network 70 at the port P6, log information regarding termination connection, for example, the termination time point and the port number of the port P6. Such transmission of communication packets as described above is performed only within the packet transmission time PT. After the packet transmission time PT elapses, the first tester 30 communicates nothing for the no-transmission supervision time TO and then stops communication for the communication stopping time OT.

The first router 50 disconnects, after the no-transmission supervision time TO within which no transmission packet is transmitted from the port P3 elapses, the line of the INS artificial network 70 connected to the second router 80. The actual measurement value acquisition section 52 records log information regarding the line disconnection of the INS artificial network 70, for example, the line disconnection time point and the port number of the port P3 into the log file. The actual measurement value acquisition section 82 in the second router 80 records, when the line of the INS artificial network 70 is disconnected, log information regarding the line disconnection, for example, the termination time point and the port number of the port P6. The first tester 30 performs the operation of the communication time CT described above repetitively for the predetermined total test time TT. After the total test time TT comes to an end, the router actual measurement value collection section 38 requests for transmission of the log information acquired by the actual measurement value acquisition section 52 or 82 designating the address (IP address) of the first router 50 and the port number of the port P3 or the address (IP address) of the second router 80 and the port number of the port P6.

The actual measurement value transmission section 56 or 86 extracts log information regarding line connection-disconnection of the port P3 or P6 from within the log file in response to the log transmission request from the router actual measurement value collection section 38 and transmits the log information to the first tester 30. The router actual measurement value collection section 38 receives the log information regarding line connection-disconnection of the port P3 and records the log information into the log file. The actual measurement value tabulation section 42 calculates, for each communication time CT, the connection time (line connection time point—line disconnection time point) from the log information regarding the connection time to calculate a total actual measurement value of the line connection time in the total test time TT, produces a test result report including the total actual measurement value of the line connection time and an expected value of the line connection time (end time of the packet transmission time PT−start time of the packet transmission time PT+no-transmission supervision time TO), and outputs the test result report by printing out or like means. Then, it is discriminated whether or not the total expected value of the line connection time is coincident with the total actual measurement value of the line connection time to test whether the line connection time of the first router 50 is normal or abnormal.

b) Test of the Packet Number

Figure 5:
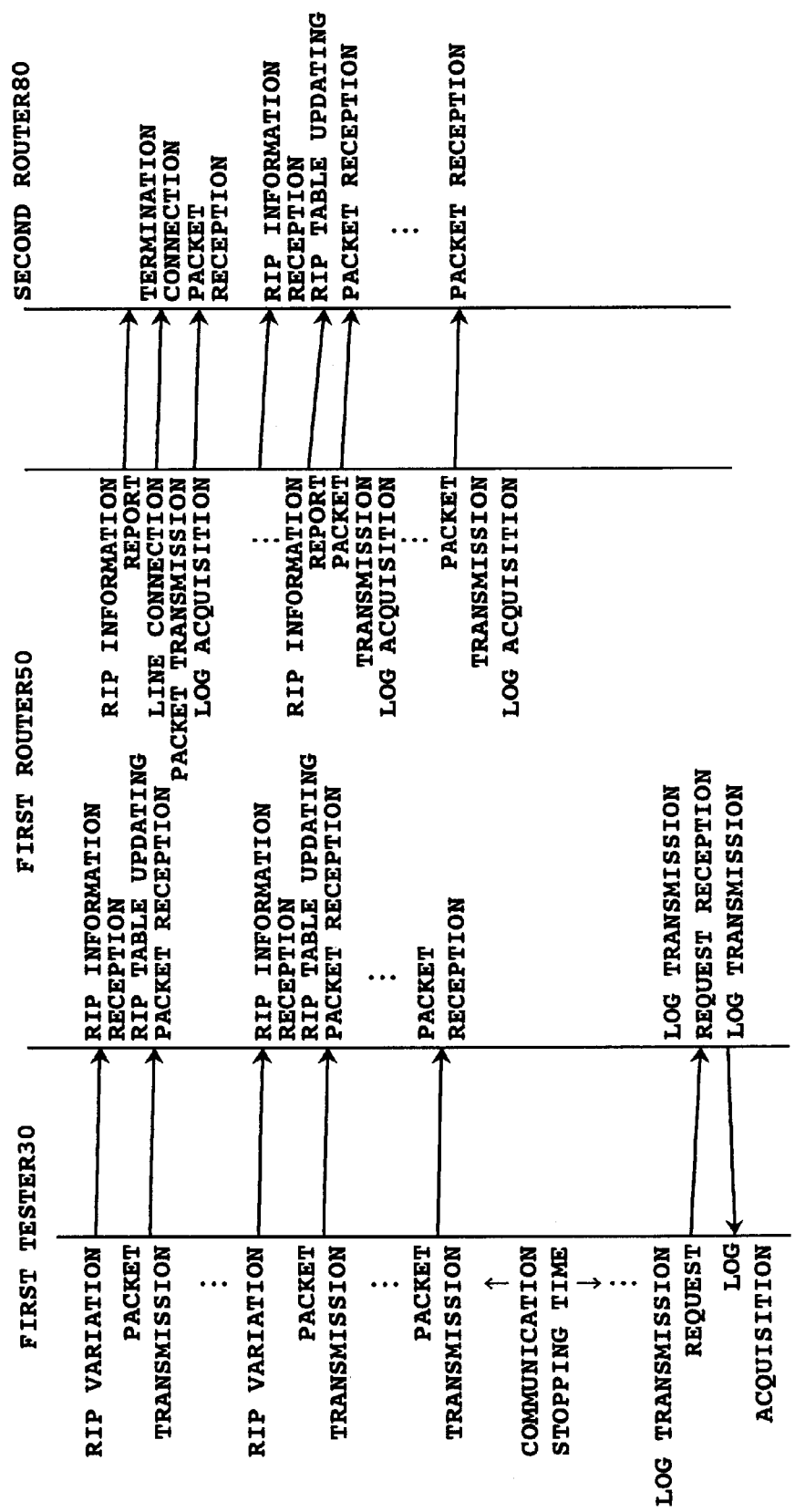
FIG. 5 is a sequence diagram illustrating a test sequence of the packet number of the repeating unit testing system shown in FIG. 2.
Figure 6:
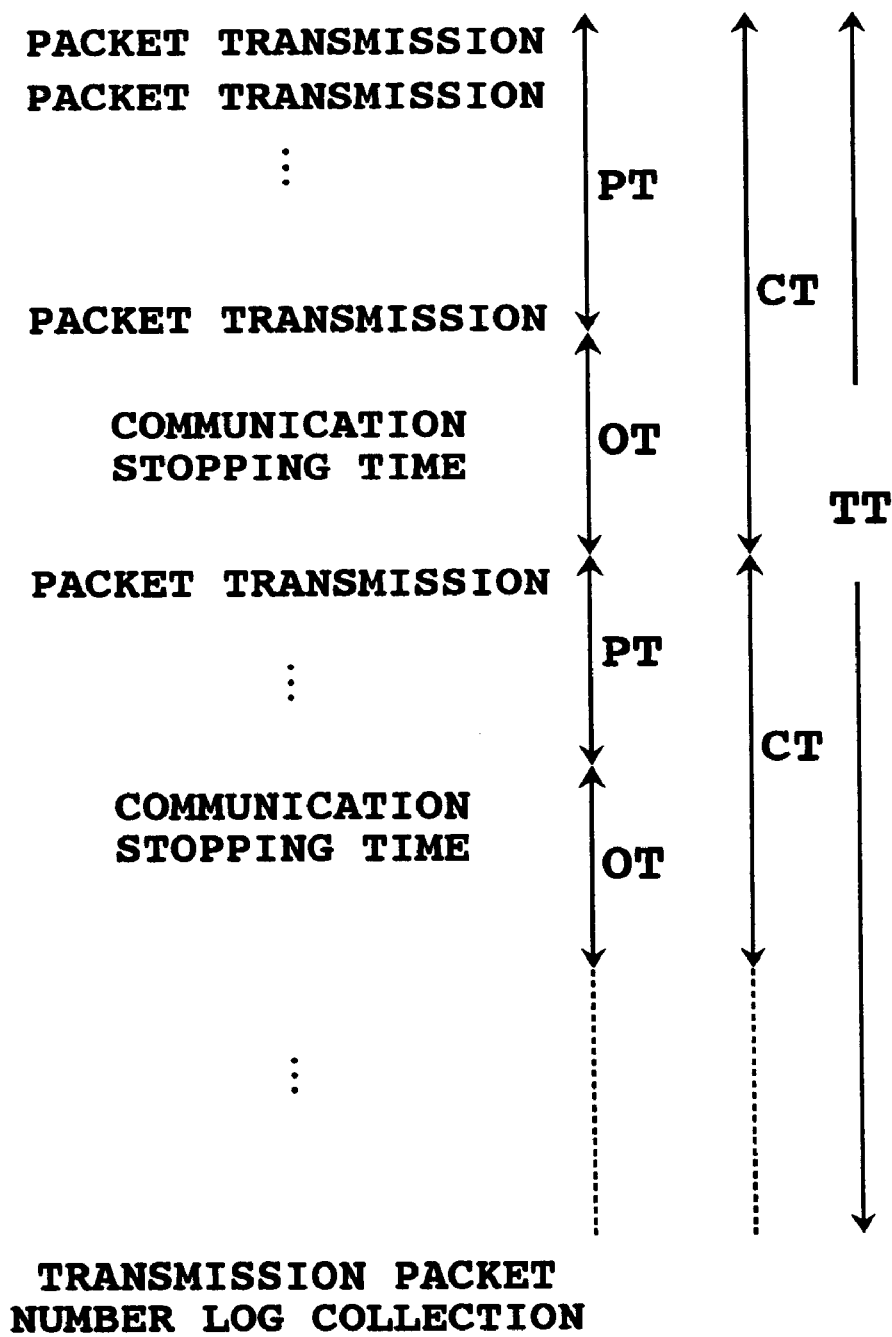
FIG. 6 is a sequence diagram illustrating a test sequence of the packet number by the first test shown in FIG. 2.

FIG. 5 is a sequence diagram illustrating a test sequence of the packet number of the repeating unit testing system of FIG. 2. A test of the transmission packet number of the first router 50 is similar to the test of the connection time, and therefore, only differences from the test of the connection time are described below. FIG. 6 is a sequence diagram illustrating a test sequence of the packet number by the first tester. Referring to FIG. 6, in the test of the packet number illustrated, a communication time CT including a packet transmission time PT and a communication stopping time OT is repeated for a total test time TT. After the total test time TT comes to an end, logs of the actual measurement value of the transmission packet number are collected and it is discriminated whether the transmission packet number from the first router 50 is normal or abnormal. It is to be noted that the packet transmission time PT and the communication stopping time OT have values equal to those in the test of the connection time.

The communication packet production section 34 produces transmission packets for the packet transmission time PT, and the communication packet transmission section 36 transmits the transmission packets to the first router 50 and records log information regarding the transmission packets, for example, the transmission time point, into the log file. The first router 50 transmits, when the transmission packets are received, the transmission packets to the second router 80 based on an address (IP address) of the destination of the transmission packets. The second router 80 receives the packets. The actual measurement value acquisition section 52 or 82 acquires log information regarding the packet transmission or the packet reception, for example, the transmission or reception time point and records it into its log file. The router actual measurement value collection section 38 requests, when the total test time TT comes to an end, for transmission of the log information acquired by the actual measurement value acquisition section 52 designating the address (IP address) of the first router 50 and the port number of the port P3 or the address (IP address) of the second router 80 and the port number of the port P6.

The actual measurement value transmission section 56 or 86 extracts, in response to the log transmission request from the router actual measurement value collection section 38, log information regarding the transmission or reception packet number of the port P3 or P6 from the log file and transmits the log information to the first tester 30. The router actual measurement value collection section 38 receives the log information regarding the transmission or reception packet number of the port P3 or P6 and records the information into the log file. The actual measurement value tabulation section 42 calculates the total transmission packet number in the total test time TT from the log information regarding the transmission or reception packets of the first router 50 or the second router 80, produces a test result report including the total transmission packet number and an expected value of the transmission packet number from the first tester 30 and outputs the test result report by printing out or the like. It is discriminated whether or not the expected value of the total packet number of the first tester 30 is coincident with the total number of packets transmitted from or received by the first router 50 or the second router 80 to test whether the total packet number of the first router 50 is normal or abnormal.

c) Test of the Line Connection Time and Test of the Packet Number by Multi-Protocols Generally, a router supports multi-protocols provided by various venders. Accordingly, the tests of the line connection time and the total packet number must be performed for each protocol. FIG. 7 is a sequence diagram illustrating a test sequence of multi-protocols by the first test shown in FIG. 2. Referring to FIG. 7, where the first router 50 supports communication protocols A to X, the multi-protocol production section 40 produces and transmits communication packets successively in accordance with the protocols A to X for successive communication times CT for a test of the line connection time or the total packet number. After transmission of the communication packets by all of the protocols is completed, log information regarding the line connection time or the transmission packet number is collected from the first router 50 or the second router 80, and discrimination of whether the line connection time and the total packet number are normal or abnormal is performed for each of the multi-protocols in a similar manner as described above.

With the first embodiment described above, the following advantages can be achieved.

(a) Since a large scale network can be simulated without preparing an actual network, tests of the connection time and the total packet number can be performed in an environment of use close to an actual environment of use.

(b) A test which uses the various protocol processing functions in the apparatus can be performed by sending out protocol packets of each vender without preparing an apparatus provided by each vender.

(c) Since the communication connection time and the packet amount can be determined in advance, an accurate communication time and an accurate total packet number can be estimated.

(d) Since the communication time and the packet number actually measured by the first router which is an object of the test can be collected by the first tester, an abnormal condition of the object of the test can be detected by comparing the collected data with respective expected values of the first tester.

(e) Since starting/ending of communication can be performed intermittently, a utilization situation close to an actual utilization situation can be produced, and also the time from an end of communication to disconnection of the line can be estimated accurately.

Second Embodiment

Figure 8:
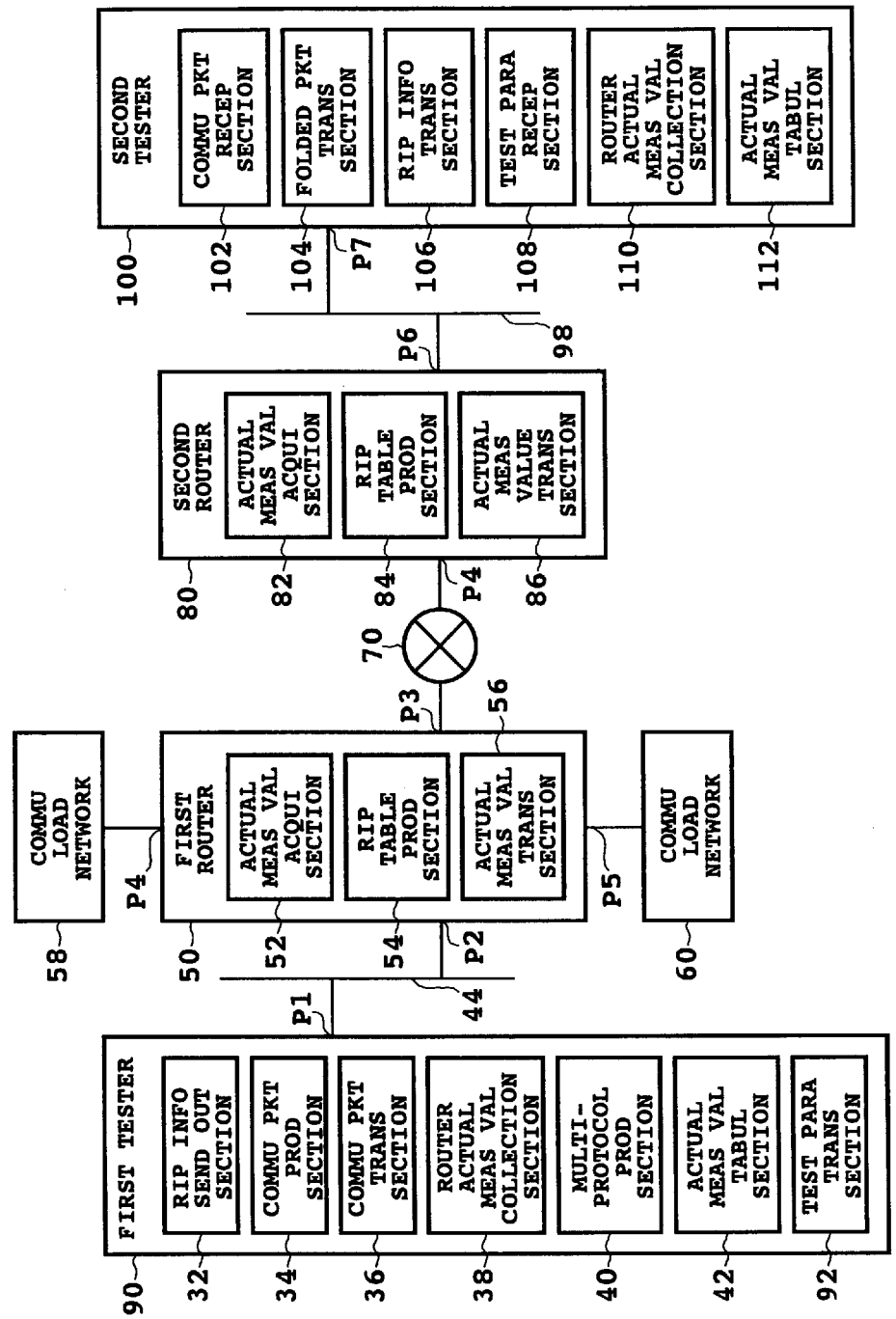
FIG. 8 is a block diagram of a repeating unit testing system according to a second embodiment of the present invention.

FIG. 8 is a block diagram of a repeating unit testing system according to a second embodiment of the present invention. In FIG. 8, substantially same elements as those of the components shown in FIG. 2 are denoted by like reference numerals. The repeating unit testing system according to the second embodiment is different from the repeating unit testing system according to the first embodiment in that a test parameter transmission section 92 is provided in a first tester 90 and that a second tester 100 is provided as a destination of transmission of the first tester 90. As seen from FIG. 8 the repeating unit testing system includes the first tester 90, a LAN 44, a first router 50, communication load networks 58 and 60, an INS artificial network 70, a second router 80, another LAN 98 and the second tester 100.

The first tester 90 includes a RIP information sending out section 32, a communication packet production section 34, a communication packet transmission section 36, a router actual measurement value collection section 38, a multi-protocol production section 40, an actual measurement value tabulation section 42 and the test parameter transmission section 92. Since the first tester 90 is similar to the first tester 30 in the first embodiment except the test parameter transmission section 92, overlapping description of it is omitted here. The test parameter transmission section 92 transmits test parameters to be used for calculation of expected values of the connection time and the total packet number of the first router 50 to the second tester 100. Since the LAN 44, first router 50, communication load networks 58 and 60, INS artificial network 70 and second router 80 have same functions as those in the first embodiment, overlapping description of them is omitted here. The LAN 98 is accommodated in a port P6 of the second router 80. The second tester 100 is accommodated in the LAN 98 by a port P7.

The second tester 100 receives communication packets transmitted thereto from the first tester 90 and performs, if the communication packets are in a flow control mode, transmission of a reception reporting packet representing that the communication packets have been received, and receives test parameters and discriminates whether the line connection time and the total packet number by the first router 50 are normal or abnormal. The second tester 100 is accommodated in the LAN 98. The second tester 100 includes a communication packet reception section 102, a folded packet transmission section 104, a RIP information transmission section 106, a test parameter reception section 108, a router actual measurement value collection section 110 and an actual measurement value tabulation section 112. The communication packet reception section 102 receives communication packets transmitted from the second router 80. The folded packet transmission section 104 transmits, when the communication packets are in a flow control mode, a packet representing that the communication packets have been received. The RIP information transmission section 106 transmits RIP information to the second router 80.

The test parameter reception section 108 receives expected values of the line connection time and the total packet number or parameters to be used for calculation of such expected values. The router actual measurement value collection section 110 collects logs actually measured by the first router 50 or the second router 80. The actual measurement value tabulation section 112 discriminates whether or not the expected values of the line connection time and the total packet number calculated from the test parameters and a line connection value and a total packet number calculated from actual measurement values collected from the first router 50 coincide with each other. The reason why the test parameter transmission section 92, test parameter reception section 108, router actual measurement value collection section 110 and actual measurement value tabulation section 112 are provided is that, while it is naturally possible for the first tester 90 to discriminate, by the router actual measurement value collection section 38 and the actual measurement value tabulation section 42, whether the line connection time and the total pocket number are normal or abnormal similarly as in the first embodiment, it is intended to allow confirmation of such discrimination by the second tester 100.

In the following, operation of the repeating unit testing system according to the second embodiment is described.

a) Confirmation of the Line Connection Time and the Total Packet Number by the First Tester 90 Side A packet transmission time PT, a no-transmission supervision time TO (line connection time) and a communications topping time OT are repeated for a fixed total test time TT in a similar manner as in the first embodiment. Here, communication packets are transmitted in a burst mode or a flow control mode. The communication packet reception section 102 in the second tester 100 receives the communication packets, and the folded packet transmission section 104 sets, in response to the communication packets transmitted in the flow control mode, packet number of the received communication packets and transmits a response packet. The first tester 90 records, when the response packet is received, into log information the information representing that a response packet to the transmission packets has been received, but records, if no response packet is received, information representing this into the log information. After the total test time TT comes to an end, the router actual measurement value collection section 38 collects actual measurement values from the first router 50, and the actual measurement value tabulation section 42 discriminates whether the line connection time and the total packet number are normal or abnormal. Further, the first tester 90 checks whether or not response packets have been received for all of the communication packets. As a result, it can be checked whether or not the communication packets have been received correctly, and a test of a high degree of reliability can be conducted.

b) Confirmation of the Line Connection Time and the Total Packet Number by the Second Tester 100 Side When it is tried to confirm the line connection time and the total packet number on the second tester 100 side, the test parameter transmission section 92 transmits, prior to transmission of communication packets, parameters to be used for calculation of expected values of the line connection time and the total packet number (for example, for a test of the line connection time, a packet time PT, a no-transmission supervision time TO, a communication stopping time OT and a total test time TT, but for a test of the total packet number, a total packet number). The test parameter reception section 108 receives and records the test parameters. The communication packet production section 34 and the communication packet transmission section 36 produce communication packets in accordance with the test parameters and transmit the communication packets. The communication packet reception section 102 receives the communication packets, and the folded packet transmission the test parameters and transmit the communication packets. The communication packet reception section 102 receives the communication packets, and the folded packet transmission section 104 transmits a response packet if the communication packets are in a flow control mode.

After the total test time TT comes to an end, the router actual measurement value collection section 110 collects log information regarding the line connection time from the first router 50 or the second router 80. The actual measurement value tabulation section 112 calculates, when a test of the line connection time is to be performed, a total line connection time from the log information regarding the line connection time, produces a test result report including an expected value of the total line connection time calculated from the test parameters and the total line connection time, outputs the test result report by printing out or the like and discriminates whether or not the expected value and the total line connection time coincide with each other. The actual measurement value tabulation section 112 calculates, when a test of the total packet number is to be performed, a total packet number from the log information regarding the total packet number, produces a test result report including a total packet number expected value calculated based on the test parameters and the total packet number, and discriminates whether or not the expected value and the total actual packet number coincide with each other.

c) Tests of the Line Connection Time and the Total Packet Number by Multi-Protocols When it is tried to perform tests of the line connection time and the total packet number by multi-protocols, the testing operations a) or b) described above should be performed for each of the multi-protocols. According to the second embodiment described above, similar advantages to those of the first embodiment can be achieved, and besides, a test can be performed also in a flow control mode and improvement in reliability of a test can be anticipated.

According to the present invention, since a large scale network can be simulated without preparing an actual network, a test of the line connection time or the total packet number can be performed in an environment of use close to an actual environment of use, and consequently, improvement in reliability of a test and reduction in test cost can be anticipated.

What is claimed is:

1. A repeating unit testing system which includes a first tester connected to a first communication network, a first repeating unit having a first port connected to said first communication network and a second port connected to a second communication network, and a second repeating unit having a third port connected to said second communication network, comprising:

first packet transmission means provided in said first tester for transmitting a plurality of packets whose transmission destination address is said second repeating unit to said first communication network for a fixed period of time;

second packet transmission means provided in said first repeating unit for receiving the packets from said first port and transmitting the packets from said second port to said second communication network;

packet reception means provided in said second repeating unit for receiving the packets from said third port;

line connection-disconnection log information acquisition means provided in said first or second repeating unit for acquiring log information whenever connection or disconnection of a line of said second communication network between said second port and said third port is done; and line connection-disconnection log information collection means provided in said first tester for collecting the log information.

2. A repeating unit testing system according to claim 1, wherein said first packet transmission means transmits the packets at predetermined time intervals.

3. A repeating unit testing system according to claim 1, wherein said first packet transmission means repeats transmission of a plurality of packets at time intervals with which the line connection of said second communication network which interconnects said second port and said third port is maintained and stopping of transmission of packets for a time which exceeds a time with which the line of said second communication network which interconnects said second port and said third port is to be disconnected.

4. A repeating unit testing system according to claim 1, further comprising line connection time tabulation means provided in said first tester for calculating an actual line connection time from the collected log information regarding connection and disconnection of the line and producing a test report including a line connection time expected value estimated from the packet transmission for the fixed period of time and the actual line connection time.

5. A repeating unit testing system which includes a first tester connected to a first communication network, a first repeating unit having a first port connected to said first communication network and a second port connected to a second communication network, a second repeating unit having a third port connected to said second communication network and a fourth port connected to a third communication network, and a second tester connected to said third communication network, comprising:

first packet transmission means provided in said first tester for transmitting a plurality of packets whose transmission destination address is said second tester to said first communication network for a fixed period of time;

second packet transmission means provided in said first repeating unit for receiving the packets from said first port and transmitting the packets from said second port to said second communication network;

third packet transmission means provided in said second repeating unit for receiving the packets from said third port and transmitting the packets from said fourth port to said third communication network;

line connection-disconnection log information acquisition means provided in said first or second repeating unit for acquiring log information whenever connection or disconnection of a line of said second communication network between said second port and said third port is done;

packet reception means provided in said third repeating unit for receiving the packets from said third communication network; and line connection-disconnection log information collection means provided in said first tester for collecting the log information.

6. A repeating unit testing system which includes a first tester connected to a first communication network, a first repeating unit having a first port connected to said first communication network and a second port connected to a second communication network, and a second repeating unit having a third port connected to said second communication network, comprising:

first packet transmission means provided in said first tester for transmitting a fixed number of packets whose transmission destination address is said second repeating unit to said first communication network;

second packet transmission means provided in said first repeating unit for receiving the packets from said first port and transmitting the packets from said second port to said second communication network;

packet reception means provided in said second repeating unit for receiving the packets from said third port;

packet log information acquisition means provided in said first or second repeating unit for acquiring log information whenever the packet transmission or the packet reception is done; and packet log information collection means provided in said first tester for collecting the log information.

7. A repeating unit testing system according to claim 6, further comprising total packet number tabulation means provided in said first tester for calculating an actual total packet number transmitted from or received by said first or second repeating unit from the collected log information regarding the packet transmission or the packet reception and producing a test report including a total packet number expected value estimated from the packet transmission of said first tester and the actual total packet number.

8. A repeating unit testing system according to claim 1, further comprising:

routing information transmission means provided in said first tester for transmitting to said first communication network more than a fixed number of routing information packets, which include routing information of a terminal apparatus artificially connected to said first communication network, within the fixed period of time; and routing information registration-reporting means provided in said first repeating unit for receiving the routing information packets, registering the routing information of the terminal apparatus into a routing table and reporting the routing information to said second repeating unit and for deleting, if the routing information is not received for more than a fixed period of time, the routing information from said routing table.

9. A repeating unit testing system according to claim 8, wherein said routing information transmission means transmits the routing information packets so that the routing information registered in said routing table may be varied within an interval from starting to ending of the transmission of the packets by said packet transmission means.

10. A repeating unit testing system according to claim 1, wherein said first packet transmission means transmits the packets to said first repeating unit in accordance with a plurality of protocols.

11. A repeating unit testing system according to claim 5, wherein said first packet transmission means transmits the packets to said first repeating unit in both of a flow control mode in which transmission of response information of the packet reception is requested and a burst mode in which no such response information is requested, said repeating unit testing system further comprising:
 response information reception means provided in said first tester for receiving the response information; and
 response information transmission means provided in said second tester for transmitting the response information to said first tester when the mode is the flow control mode.

12. A repeating unit testing system according to claim 1, further comprising:
 a communication load apparatus connected to a fourth communication network for transmitting to said fourth communication network communication data for applying a communication load to said first repeating unit; and
 a fifth port provided in said first repeating unit for accommodating said fourth communication network.

13. A repeating unit testing system according to claim 1, wherein said second communication network is an artificial network.

14. A communication apparatus connected to a transmission system which includes a plurality of repeating units and a network including a line interconnecting said plurality of repeating units, comprising:
 transmission means for sending out data destined for an apparatus which has a predetermined address in a predetermined sequence through said repeating units and said network; and
 log information collection means for collecting log information recorded into those of said repeating units which receive the data whenever a specific operation is done in said repeating units.

15. A communication apparatus according to claim 14, wherein said transmission means sends out the data to an address of a pertaining one of said repeating units.

16. A communication apparatus according to claim 15, wherein said log information collection means collects, as the log information, information regarding a connection time of the line between those of said repeating units which receive the data.

17. A communication apparatus according to claim 15, wherein said transmission means sends out a plurality of packets, and said log information collection means collects, as the log information, information regarding a number of the packets.

18. A communication apparatus connected to a transmission system which includes a plurality of repeating units and a network including a line interconnecting said plurality of repeating units, comprising:
 reception means for receiving data sent thereto from an object apparatus of communication through said repeating units and said network in accordance with a predetermined sequence;
 expected value collection means for collecting expected values of the sequence from the object apparatus of communication; and
 log information collection means for collecting log information recorded into those of said repeating units which receive the data whenever a specific operation is done in said repeating units.

19. A communication apparatus according to claim 18, wherein said expected value collection means and said log information collection means collect information regarding a connection time of the line between the repeating units which receive the data.

20. A communication apparatus according to claim 19, wherein said expected value collection means and said log information collection means collect information regarding a packet number.

21. A communication method for a transmission system which includes a plurality of repeating units, a network including a line interconnecting said plurality of repeating units, and a communication apparatus connected to one of said repeating units, comprising:
 sending out data destined for an apparatus which has a predetermined address in a predetermined sequence from said communication apparatus through said repeating units and said network; and
 collecting log information recorded into those of said repeating apparatus which receive the data into said communication apparatus whenever a specific operation is done in said repeating units.

22. A communication method according to claim 21, wherein the data are sent out to an address of a pertaining one of said repeating units.

23. A communication method according to claim 22, wherein, as the log information, information regarding a connection time of the line between those of said repeating units which receive the data is collected.

24. A communication method for a transmission system which includes a plurality of repeating units, a network including a line interconnecting said plurality of repeating units, and a plurality of communication apparatus connected to different ones of said repeating units from each other, comprising:
 sending out data from a first one of said communication apparatus to a second one of said communication apparatus through said repeating units and said network in accordance with a predetermined sequence;
 sending out expected values of the sequence from the first communication apparatus to the second communication apparatus; and
 collecting log information recorded into those of said repeating units which receive the data by the second communication apparatus whenever a specific operation is done in said repeating units.

25. A communication method according to claim 24, wherein, as the expected values and the log information, information regarding a connection time of the line between those of said repeating units which receive the data is collected.

26. A communication method according to claim 24, wherein a plurality of packets are sent out from the first communication apparatus to the second communication apparatus, and information regarding a number of the packets is collected as the expected values and the log information.

27. A repeating unit having a first port connected to a first communication network and a second port connected to a second communication network comprising:
  first packet transmission means for receiving the packets from said first port and transmitting the packets from said second port to said second communication network;
  line connection-disconnection log information acquisition means for acquiring log information whenever connection or disconnection of a line of said second communication network is done; and
  line connection-disconnection log information transmission means for transmitting the log information to said first communication network.

28. A repeating unit testing system which includes a first tester connected to a first communication network, a first repeating unit having a first port connected to said first communication network and a second port connected to a second communication network, and a second repeating unit having a third port connected to said second communication network, comprising:
  a first packet transmission unit provided in said first tester transmitting a plurality of packets whose transmission destination address is said second repeating unit to said first communication network for a fixed period of time;
  a second packet transmission unit provided in said first repeating unit receiving the packets from said first port and transmitting the packets from said second port to said second communication network;
  a packet reception unit provided in said second repeating unit receiving the packets from said third port;
  a line connection-disconnection log information acquisition unit provided in said first or second repeating unit acquiring log information whenever connection or disconnection of a line of said second communication network between said second port and said third port is done; and
  a line connection-disconnection log information collection unit provided in said first tester collecting the log information.

29. A repeating unit testing system which includes a first tester connected to a first communication network, a first repeating unit having a first port connected to said first communication network and a second port connected to a second communication network, a second repeating unit having a third port connected to said second communication network and a fourth port connected to a third communication network, and a second tester connected to said third communication network, comprising:
  a first packet transmission unit provided in said first tester transmitting a plurality of packets whose transmission destination address is said second tester to said first communication network for a fixed period of time;
  a second packet transmission unit provided in said first repeating unit receiving the packets from said first port and transmitting the packets from said second port to said second communication network;
  a third packet transmission unit provided in said second repeating unit receiving the packets from said third port and transmitting the packets from said fourth port to said third communication network;
  a line connection-disconnection log information acquisition unit provided in said first or second repeating unit acquiring log information whenever connection or disconnection of a line of said second communication network between said second port and said third port is done;
  a packet reception unit provided in said third repeating unit receiving the packets from said third communication network; and
  a line connection-disconnection log information collection unit provided in said first tester collecting the log information.

30. A repeating unit testing system which includes a first tester connected to a first communication network, a first repeating unit having a first port connected to said first communication network and a second port connected to a second communication network, and a second repeating unit having a third port connected to said second communication network, comprising:
  a first packet transmission unit provided in said first tester transmitting a fixed number of packets whose transmission destination address is said second repeating unit to said first communication network;
  a second packet transmission unit provided in said first repeating unit receiving the packets from said first port and transmitting the packets from said second port to said second communication network;
  a packet reception unit provided in said second repeating unit receiving the packets from said third port;
  a packet log information acquisition unit provided in said first or second repeating unit acquiring log information whenever the packet transmission or the packet reception is done; and
  a packet log information collection unit provided in said first tester collecting the log information.

31. A communication apparatus connected to a transmission system which includes a plurality of repeating units and a network including a line interconnecting said plurality of repeating units, comprising:
  a transmission unit sending out data destined for an apparatus which has a predetermined address in a predetermined sequence through said repeating units and said network; and
  a log information collection unit collecting log information recorded into those of said repeating units which receive the data whenever a specific operation is done in said repeating units.

32. A communication apparatus connected to a transmission system which includes a plurality of repeating units and a network including a line interconnecting said plurality of repeating units, comprising:
  a reception unit receiving data sent thereto from an object apparatus of communication through said repeating units and said network in accordance with a predetermined sequence;
  an expected value collection unit collecting expected values of the sequence from the object apparatus of communication; and a log information collection unit collecting log information recorded into those of said repeating units which receive the data whenever a specific operation is done in said repeating units.

33. A repeating unit having a first port connected to a first communication network and a second port connected to a second communication network comprising:

a first packet transmission unit receiving the packets from said first port and transmitting the packets from said second port to said second communication network;

a line connection-disconnection log information acquisition unit acquiring log information whenever connection or disconnection of a line of said second communication network is done; and a line connection-disconnection log information transmission unit transmitting the log information to said first communication network.

* * * * *